United States Patent
Dey et al.

(10) Patent No.: US 9,955,450 B2
(45) Date of Patent: Apr. 24, 2018

(54) GEO-LOCALIZATION ASSEMBLY AND METHODOLOGY

(71) Applicants: Saikat Dey, Birmingham, MI (US); Gerrit Reepmeyer, Novi, MI (US); Anupam Sengupta, Troy, MI (US); Mikhail Zhavoronkov, Northville, MI (US); Senni Perumal, Southfield, MI (US); Steven Friedman, Concord, CA (US)

(72) Inventors: Saikat Dey, Birmingham, MI (US); Gerrit Reepmeyer, Novi, MI (US); Anupam Sengupta, Troy, MI (US); Mikhail Zhavoronkov, Northville, MI (US); Senni Perumal, Southfield, MI (US); Steven Friedman, Concord, CA (US)

(73) Assignee: Guardhat, Inc., Southfield, MI (US)

( * ) Notice: Subject to any disclaimer, the term of this patent is extended or adjusted under 35 U.S.C. 154(b) by 0 days.

(21) Appl. No.: 15/089,115

(22) Filed: Apr. 1, 2016

(65) Prior Publication Data

US 2017/0289951 A1   Oct. 5, 2017

(51) Int. Cl.
H04W 24/00 (2009.01)
H04W 64/00 (2009.01)
H04W 52/02 (2009.01)

(52) U.S. Cl.
CPC ..... *H04W 64/006* (2013.01); *H04W 52/0209* (2013.01)

(58) Field of Classification Search
CPC ................. H04W 52/0209; H04W 64/006
See application file for complete search history.

(56) References Cited

U.S. PATENT DOCUMENTS

| 2012/0173141 A1* | 7/2012 | Scales ............ G01S 19/21 701/484 |
| 2015/0170207 A1* | 6/2015 | Postrel ............ G06Q 30/02 705/14.53 |
| 2016/0077215 A1* | 3/2016 | Ische ............ G01S 19/46 342/357.29 |

* cited by examiner

*Primary Examiner* — Wayne H Cai
(74) *Attorney, Agent, or Firm* — Simonelli IP, PLLC

(57) ABSTRACT

A geo-localization device and methodology use a plurality of wireless localization technologies, predictive methods and filtering to deliver accurate and reliable 3-dimensional positioning data for static and moving objects both outdoor and indoor.

9 Claims, 5 Drawing Sheets

GEO-LOCALIZATION ASSEMBLY AND METHODOLOGY

BACKGROUND ART

1. Field of the Invention

The invention relates to geo-localization devices and methodologies that use multiple wireless localization technologies, predictive methods and filtering to determine accurate 3-dimensional (3-D) positioning data both outdoors and indoors, and even in hostile wireless signal environments, for example, heavy industrial manufacturing sites.

2. Description of the Related Art

As of today, there are many different wireless technologies available in the market that each individually can help generate 1-dimensional (1-D), 2-D or 3-D geo-localization data to varying degrees of accuracy, for example, Ultra-Wide Band (UWB), Global Navigation Satellite System (GNSS), Wi-Fi, Bluetooth (BLE), RFID, cellular (3G, 4G/LTE), barometers, gyroscopes, or Inertial Measurement Units (IMU). Examples of GNSS include GPS, differential GPS (dGPS), GLONASS, GALLILEE, BeiDou and IRNSS, and shall hereinafter generally be referred to as GPS.

Current geo-localization technology, however, faces many challenges particularly in industrial environments that feature both outdoor and indoor areas. Many industrial environments are not sufficiently equipped with wireless localization technology; even if wireless localization technology is installed in a plant (for example a Wi-Fi or Bluetooth network), signal reception and the ability for wireless signal processing is oftentimes limited due to hostile environments for certain radio frequencies, such as high metal contents creating multi-path and severe wireless signal attenuation. In addition, some wireless localization techniques like GPS work reliably only outdoors. Particularly, determining the accurate location of static or moving objects or humans in industrial environments can be cumbersome with current wireless technologies and protocols, especially when considering that current geo-localization technology does not usually provide true three dimensional positioning data.

None of the currently available technologies on its own has proven to be a highly accurate and reliable geo-localization standard for industrial sites, given that each of the available technologies—while each having specific advantages—have particular disadvantages for certain situations in industrial environments (for example, frequency or signal strength).

SUMMARY OF THE INVENTION

A geo-localization device uses a plurality of wireless technologies, predictive methods and filtering to calculate and output accurate and reliable 3-dimensional positioning data.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

This invention addresses the previously described challenges by combining a plurality of wireless technologies, using predictive methods and filtering, and by offering a logic for data fusion and the use of the most accurate and reliable technology depending on the confronted environment. While the system may or may not use multiple protocols simultaneously, the user of the geo-localization data will be able to see a seamless 3-D tracking of position both indoors and outdoors.

The invention is a geo-localization assembly that includes a plurality of wireless localization technologies (e.g., UWB, GPS, Wi-Fi, Bluetooth/BLE, RFID, cellular including 4G/LTE, barometer, gyroscope, IMU) and uses predictive and filtering technologies (Kalman filter, particle filter, weighted averaging) along with data fusion to generate highly accurate positioning data. The data generated from multiple localization technologies is passed through a stateful data fusion algorithm that also uses predictive and filtering techniques to output current 3-D position data that is highly accurate and reliable (hybrid ranging). While some wireless localization protocols require connectivity to a server or back-end platform, this invention also allows the device to calculate accurate 3-D positioning data even without any wireless connectivity as well as in the absence of wireless localization protocols, in effect making the device self-aware of its location.

Figure 1:
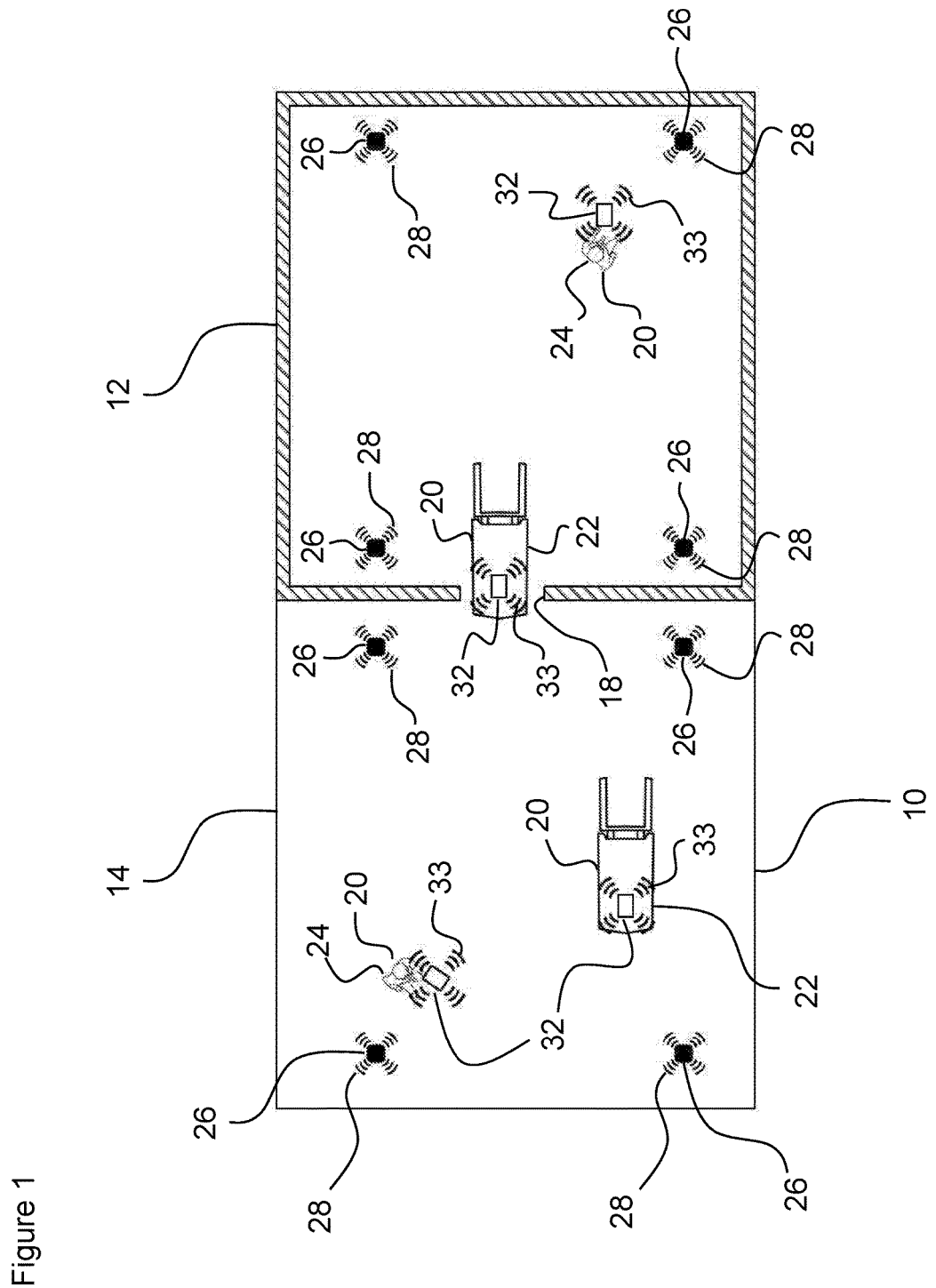
FIG. 1 is an environmental perspective view of one embodiment of the invention.

Referring to FIG. 1, an industrial plant is graphically shown at 10. The industrial plant 10 includes an indoor portion 12 and an outdoor portion 14, with an access port 18 providing access between the two portions 12, 14. It should be appreciated by those skilled in the art that the industrial plant 12 may be any building or complex through which entities, generally shown at 20, travel. Entities 20 are either objects 22 or humans 24. These entities 20 warrant their respective identification and location/positioning. The entities 20 are either static or move dynamically across the industrial plant 10. Either of these entities 20 may transition between the indoor 12 and outdoor 14 portions using the access port or door 18.

In order to locate entities 20 and report on entity locations in an automated manner, a wireless infrastructure, graphically represented by beacons 26 that emit and receive electromagnetic radiation, graphically represented by arcuate waves 28. The beacons 26 that are statically mounted across the industrial plant 10 in a manner such that the electromagnetic radiation 28 can blanket the entire industrial plant 10.

While the beacons 26 provide wireless localization coverage across the entire industrial plant 10, they are static. More specifically, the beacons 26 do not move once positioned within the industrial plant 10. It may be that a beacon 26 is moved or another is added due to changes in the machinery, equipment, or floor plan that may change over time, but the beacons 26 are designed to operate during the normal course of business by remaining stationary.

Figure 2:
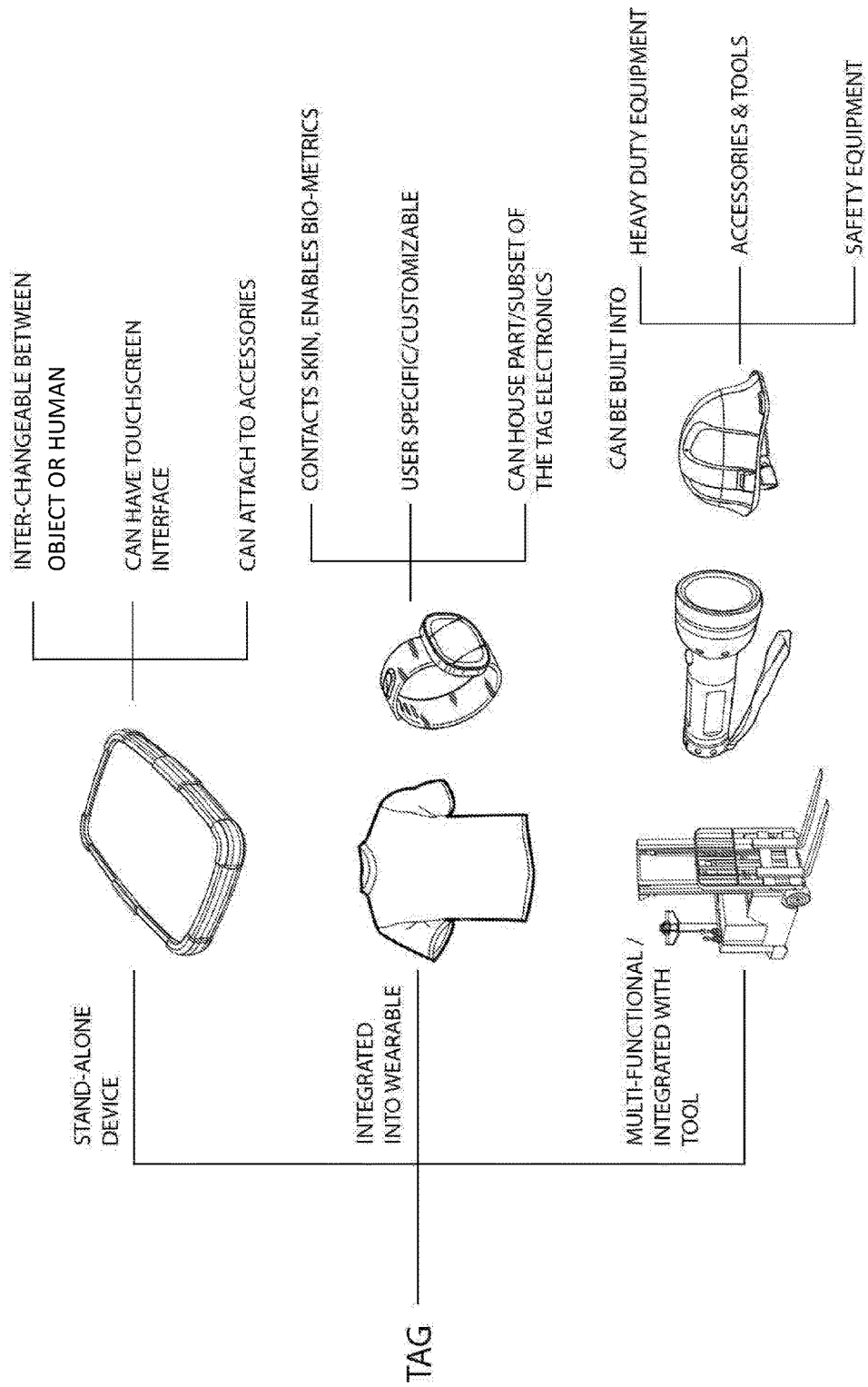
FIG. 2 is a schematic of different shapes or form factors incorporated into the invention

The wireless infrastructures 26 also includes tags 32. The tags 32 are small units designed to receive and transmit electromagnetic radiation, graphically represented by arcuate waves 33, in wavelengths and/or frequencies that are recognizable by the beacons 26. The tags 32 are attached to or carried by the objects 22, such as trucks, cranes, fork lifts, pallets and the like; or to humans 24, by being attached to clothing or personal protective equipment, or even on their body. In general, the tags 32 can take many different shapes or form factors. FIG. 2 provides an exemplary overview of possible form factors for the tags 32.

A tag 32 can either be (i) a stand-alone device (interchangeable between the object 22 or human 24), (ii) integrated into wearable equipment, or (iii) a multi-functional device that is integrated with existing tools, such as mobile equipment, tools, or a hard hat. The tags 32 may be interactive by including input devices, such as a touch screen or they may be purely reactionary to signals received from the beacons 26.

In conjunction, the beacons 26 and tags 32 can determine the individual locations of each of the tags 32 by communicating with each other through various wireless protocols. This allows each geo-localization device, or tag 32, to auto-calibrate itself by triangulating its own location in relation to the location of all other devices 26, 32 in the system of the wireless infrastructure 26.

Figure 3:
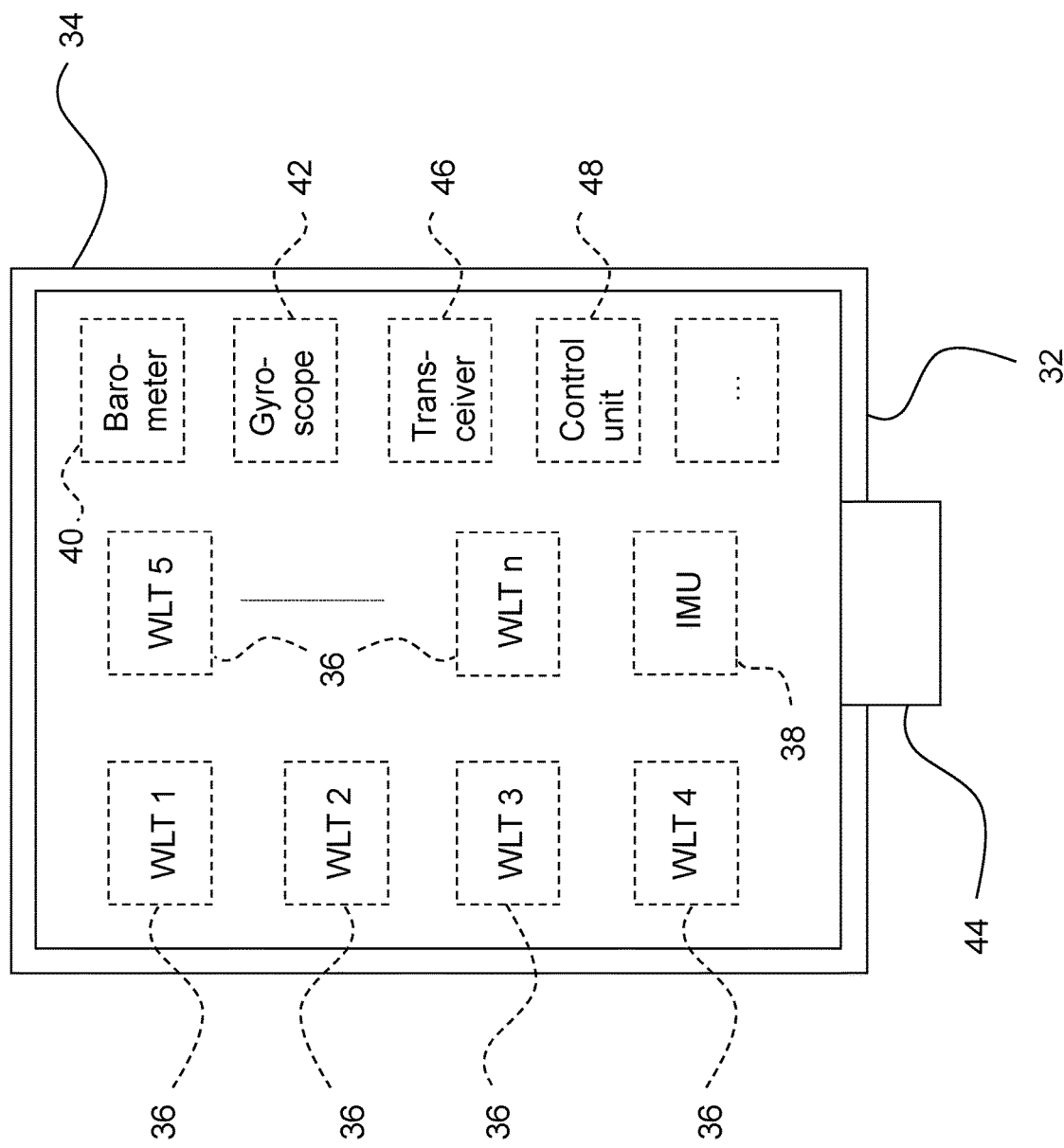
FIG. 3 is a block diagram of one embodiment of the invention.

Referring to FIG. 3, a block diagram of components of a device that may be one of the beacons 26 or one of the tags 32 as they may largely be interchangeable. More specifically, many of the components of the beacon 26 will make it useful as a tag 32 and likewise, many of the components of the tag 32 will make it useful as a beacon 26. The remainder of the discussion of FIG. 3 will be in terms of the tag 32. It should, however, be known to those skilled in the art that the description could be used to describe the beacon 26.

The tag 32 includes a casing 34 that encases and protects the electronic components. This casing 34 is designed in a way that it will meet the specific requirements of the environments that these tags 32 faces. For example, the casing 34 will comply with certain industrial grade or ingress protection standards. The tag 32 consists of a plurality of Wireless Localization Technologies (WLT) 36, an Inertial Measurement Unit (IMU) 38, a barometer 40, a gyroscope 42. (Because the IMU 38 would include an accelerometer, a gyroscope and possibly a magnetometer, the tag 32 may not require its own gyroscope 42 and may rely on the gyroscope in the IMU 38.) The WLTs 36, the IMU 38, the barometer 40 and the gyroscope 42 all incorporate wireless protocols to communicate either directly, or through a control unit that will prioritize/organize the communications between the tag 32 and the beacons 26. The tag 32 is powered through a power source 44 that can either be a battery, a regular electrical outlet, a Power-over-Ethernet cable (for the beacons 26), or any other external power source. The tag 32 can consist of, but are not limited to, any of the following protocols and/or location positioning technologies:

Ultra-Wide Band (UWB)
GPS
Wi-Fi
Bluetooth/BLE
RFID
Cellular (3G, 4G/LTE), and any of the technologies discussed above.

These protocols and location positioning solutions include both indoor as well as outdoor localization solutions that provide 1-D, 2-D or 3-D location data to varying degrees of accuracy. These multiple localization technologies are combined into an integrated, seamless 3-D position tracking (hybrid ranging). While all of these solutions typically rely on some form of wireless signal connectivity to a beacon 26, access point or any other enabled or enabling device (e.g., GPS satellite), the tags 32 will also be able to determine their own position autonomously, i.e. without connection to any of the beacons 26 or other tags 32. To achieve this, the localization technology set mentioned above is being complemented by a predictive method of dead reckoning of the location, for instance, through the IMU 38 to predict the likely location of the tag 32 when wireless connectivity is not present.

The tag 32 includes a control unit 48 for receiving location output signals from each of the WLTs 36, the IMU 38, the barometer 40 and the gyroscope 42. The control unit 48 creates a three dimensional location identification signal based on location output signals of each of these devices 36-42.

The tag 32 also includes a transceiver 46, which is electrically connected to the control unit 48 and each of the plurality of devices 36-42. The transceiver 46 transmits the three dimensional location identification signal to a location remote of said geo-localization device, such as a beacon 26.

Figure 4:
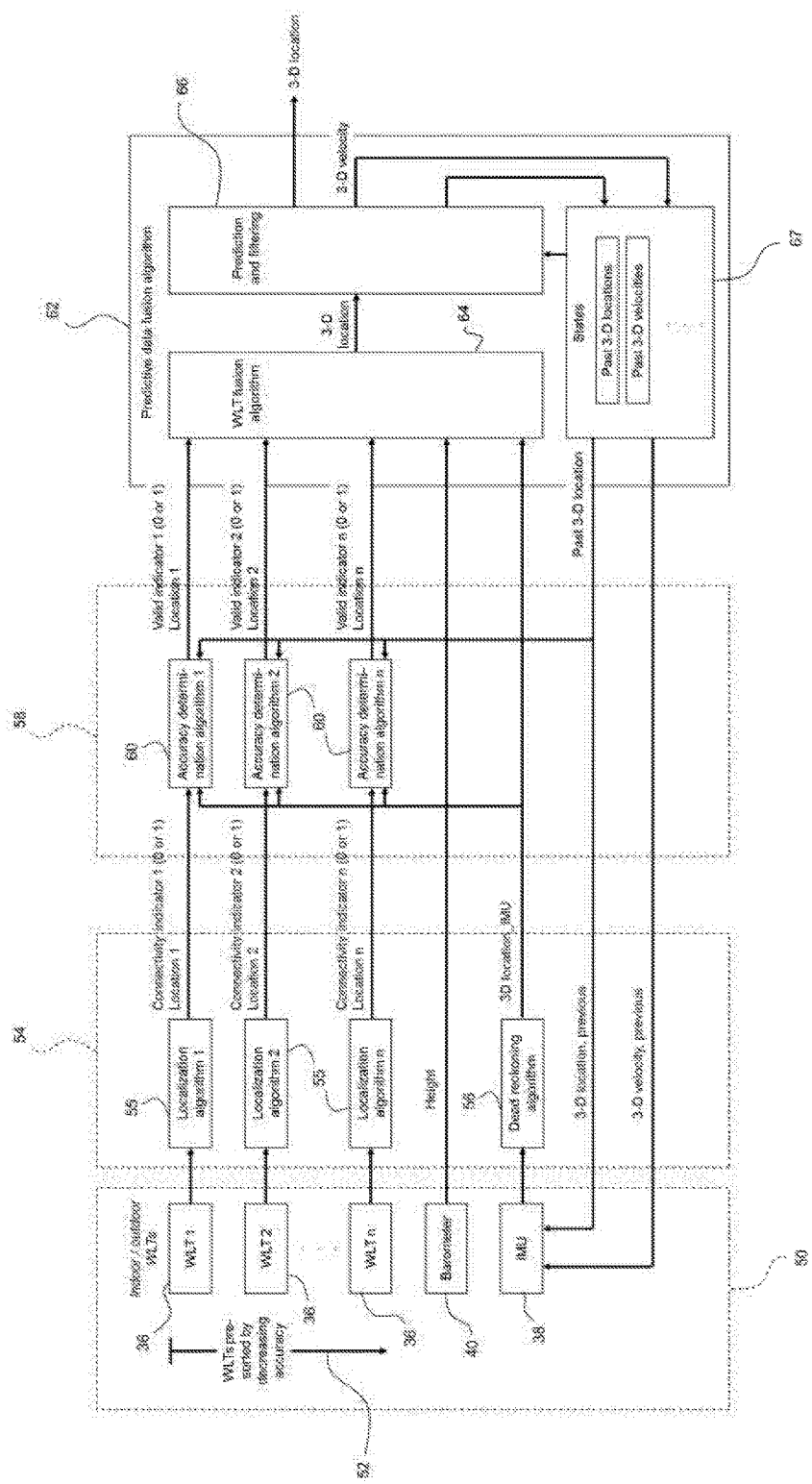
FIG. 4 is a block-diagram one embodiment of the inventive method incorporating the use of various inputs.

In order to calculate accurate 3-D location data of one of the tags 32 or beacons 26 (moving or not) attached to an object 22 or human 24, the location data output from each wireless localization technology is combined in a stateful data fusion algorithm along with data created by the barometer 40 and the IMU 38. FIG. 4 describes in more detail the methodology used to output an accurate 3-D position. In a first step at 50, the system sorts all available wireless localization technologies according to its theoretical localization accuracy. Certain technologies are typically more accurate (for example, UWB), whereas other technologies are typically less accurate (for example, GPS). This degree of accuracy is graphically represented by a downwardly directed arrow 52. The degree of accuracy can be inherent in the device (a known bounded error value) which can be compared against the inherent bounded error values of the other devices or it can be a calculated average error.

A second step 54 involves calculating the current location data and connectivity of each wireless localization technology. Each WLT 36 has its own localization algorithm 55 (including protocol) that outputs location data along with a connectivity indicator that can take values of 1 or 0 indicating if the localization algorithm has enough connectivity information to output valid location data or not. Note that the location data output by a wireless localization technology can be a 1D, 2D or 3D location depending on the particular technology, for example, GPS outputs only 2D data but not height. The IMU data is passed through a dead reckoning algorithm 56 along with previously calculated 3D location data and previously calculated 3D velocity to output IMU generated 3D location (3Dlocation_IMU). The previously calculated 3D location data and previously calculated 3D velocity are part of the stored state of the overall algorithm.

A third step 58 involves calculating the accuracy/validity of the location data output by each WLT 36. The calculated location data and connectivity indicator of each WLT 36 along with IMU generated 3D location and some stored state (e.g., past calculated 3D location values) is input into an accuracy determination algorithm 60 that determines if the output location data is accurate. The output of the algorithm 60 is a location validity indicator that takes values of 1 or 0 if the calculated location data is accurate or not along with calculated location data. If the connectivity indicator is 0, then the accuracy determination algorithm is not run and the location validity indicator is 0.

This location data and location validity indicator from multiple WLTs 36 along with data from the barometer 40 and location 3D information generated from the IMU 38 (3Dlocation_IMU) is then input to a stateful data fusion algorithm 62 that fuses valid location data from the multiple WLTs 36, the barometer 40 and IMU 38 generated 3D location. A variety of predictive and filtering techniques (including but not limited to Kalman filtering, non-linear filtering (particle filter), weighted averaging) to output accurate 3-D location of the tag 32 or beacon 26. An exemplary Wireless Localization Technology (WLT) fusion algorithm 64 is as follows: The WLT fusion algorithm 64 goes through the wireless localization technologies from most accurate to least accurate and chooses the location data from the first wireless localization technology whose location validity indicator is 1. The output of the WLT fusion algorithm 64 is received by a prediction and filtering unit 66. The prediction and filtering unit 66 produces two outputs. The first is an iterative 3-D location signal. The second output is a calculation of a vector measurement of velocity. The second output is received by a states memory 67 that is used for iterative calculations by the IMU 38 and the accuracy determination algorithms 60. The states memory 67 is a device that stores historical data in order to enhance the accuracy of future calculations.

Figure 5:
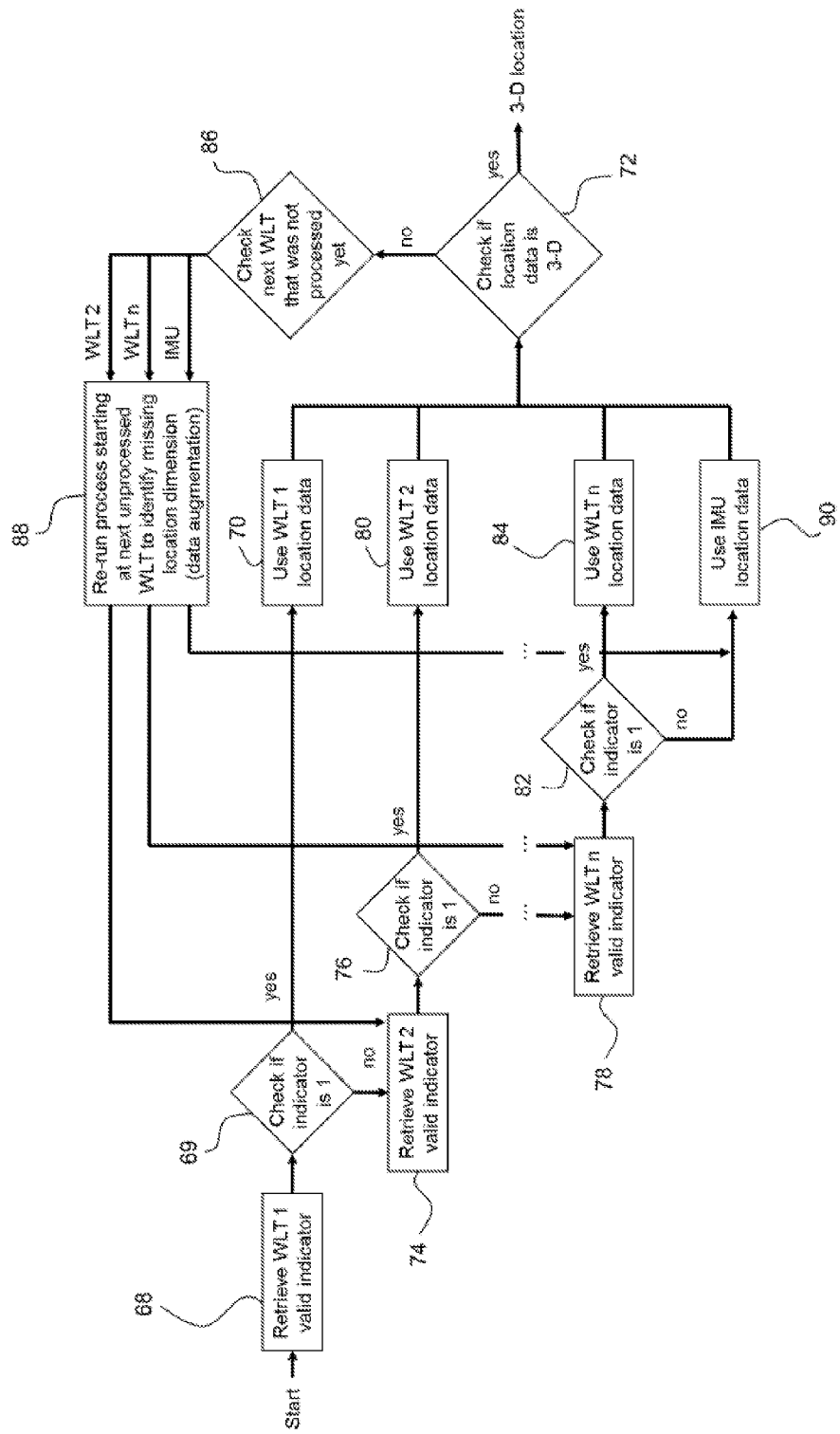
FIG. 5 is a logic flow chart of one embodiment of the inventive method.

Referring to FIG. 5, the stateful data fusion algorithm augments dimensions missing from the location data (for example, this location data could be 2D) with the required dimensions from next most accurate and valid wireless localization technology. The algorithm begins by retrieving a valid indicator from the first WLT 36, which by definition is the most accurate WLT 36, at 68. It is determined at 69 whether the indicator is a 1 or a 0. If the indicator is a 1, the location data from the WLT 36 is used at 70. The location data is checked at 72 to see if it is 3-D. If so, the process produces the 3-D location and returns.

If the first WLT 36 does not produce an indicator value of 1 (at 69), the indicator for the second WLT 36 is retrieved at 74. The second WLT 36 is what was measured to be the second most accurate WLT 36. It is determined at 76 whether the indicator for the second WLT 36 is a 1. If not, the algorithm continues at 78 to check the WLTs 36 until it finds one with an indicator value of 1.

If the indicator value for the second WLT 36 is 1, that data is used at 80. If it was not a 1, the subsequent indicator values for the subsequent WLTs 36 are checked at 82. As soon as an indicator value is 1, it is used at 84.

Like the first WLT 36, after an indicator value of 1 is identified, it is determined whether the location data is 3-D (at 72). If it is not, it is determined at 86 as to whether data from all of the WLTs 36 has been read at 86. The process is rerun at 88 so that the data augmentation can continue until the location data is fully 3-D. The order through which the WLTs 36 are checked is from the most accurate to the least accurate.

If all of the WLTs 36 have been measured and the location data has not been fully augmented to achieve 3-D value, the location data (from the dead reckoning algorithm 56) from the IMU 38 is used at 90. Note that if none of the WLTs 36 are connected or connectivity is weak/inaccurate, current IMU 3D location data (from the dead reckoning algorithm 56) is used and provides input to a predictive and filtering algorithm 66 to generate the most accurate 3-D tag 32 or beacon 26 location. Overall, this stateful data fusion methodology ensures that the multiple wireless technologies that have connectivity are dynamically combined with IMU and barometer data in a seamless manner to output accurate 3-D location data, making this solution ideal for use in heavy industrial manufacturing sites where surrounding high metal content causes multi-path and severe wireless signal attenuation.

In addition to calculating accurate 3-D location data, the system optimizes the selection of WLTs 36 and protocols by applying a sophisticated power management scheme that ensures that high power consuming technologies and protocols are turned off while lower power consuming technologies are determining the location of the respective objects 22 or humans 24.

Also, given that the computing of 3-D location happens on the tag or beacon, each device effectively becomes self-aware of its own location, even when wireless connectivity is not present (offline mode). This ultimately allows the geo-localization devices to determine the location autonomously at the device level. This is particularly helpful in heavy manufacturing environments where it is extremely difficult for any wireless infrastructure to fully ensure comprehensive and complete coverage.

Overall, the geo-localization data that is being generated by the device and methodology can be used to locate humans or objects in the intended environments for the use of this solution, i.e. areas with hostile wireless signal environments. The described approach will ensure that humans or objects are always located with the highest possible level of accuracy, which is especially critical in environments with the described characteristics, such as heavy manufacturing or industrial sites. The positioning data can then be used to visualize the location of humans or objects and to utilize their position in further applications that rely on accurate positioning data.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A method for calculating three-dimensional position data of a geo-localization device using a plurality of wireless localization technologies each providing a localization output signal, the method comprising the steps of:
   determining the most accurate of the plurality of wireless localization technologies and identifying it as the first wireless localization technology;
   retrieving the localization output signal from the first wireless localization technology;
   calculating the three-dimensional position data of the geo-localization device;
   identifying whether the three-dimensional position data is complete;
   obtaining the localization output signal of a second most accurate wireless localization technology when it is determined the three-dimensional position data is not complete; and
   recalculating the three-dimensional position data after each of the localization output signal from the next most accurate of the wireless localization technologies is incorporated into the recalculation.

2. A method as set forth in claim 1 wherein the step of recalculating the three-dimensional position data includes iteratively stepping through each of the localization output signal from each of the wireless localization technologies from the most accurate to the least accurate until the three-dimensional position data is complete.

3. A method as set forth in claim 2 including the step of creating a least most accurate localization output signal from an inertial measurement unit.

4. A method as set forth in claim 3 including the step of further recalculating the three-dimensional position data by incorporating the least most accurate localization output signal from the inertial measurement unit after the three-dimensional position data remains incomplete after all of the localization output signals from all of the plurality of wireless localization technologies are used.

5. A method as set forth in claim 1 including the step of operating independently of system connectivity.

6. A method as set forth in claim 1 wherein the method provides the user of the geo-localization system seamless tracking of positioning data for the geo-localization device as it transitions between indoor and outdoor locations.

7. A method as set forth in claim 1 wherein the method uses power management technology to minimize overall power consumption of the plurality of wireless technologies and protocols.

8. A method as set forth in claim 1 wherein the geo-localization devices can determine their location autonomously at the device level.

9. A method as set forth in claim 1 wherein the position of a device can be dead reckoned to predict the likely location of the device.

\* \* \* \* \*